US012662602B2

(12) United States Patent
Gozu et al.

(10) Patent No.: US 12,662,602 B2
(45) Date of Patent: Jun. 23, 2026

(54) INK JET INK COMPOSITION AND RECORDING METHOD

(71) Applicant: SEIKO EPSON CORPORATION, Tokyo (JP)

(72) Inventors: Sena Gozu, Shiojiri (JP); Kenta Uchida, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 167 days.

(21) Appl. No.: 18/473,381

(22) Filed: Sep. 25, 2023

(65) Prior Publication Data

US 2024/0124732 A1 Apr. 18, 2024

(30) Foreign Application Priority Data

Sep. 26, 2022 (JP) ................................ 2022-152294

(51) Int. Cl.
*C09D 11/322* (2014.01)
*B41J 2/01* (2006.01)
(Continued)

(52) U.S. Cl.
CPC ............... *C09D 11/322* (2013.01); *B41J 2/01* (2013.01); *B41J 2/2107* (2013.01); (Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553;
(Continued)

(56) References Cited

U.S. PATENT DOCUMENTS

| | | | | |
|---|---|---|---|---|
| 2007/0149647 A1* | 6/2007 | Yoshida | C09D 11/30 | 523/160 |
| 2008/0028980 A1* | 2/2008 | Aoki | C09D 11/30 | 347/100 |

(Continued)

FOREIGN PATENT DOCUMENTS

| | | |
|---|---|---|
| JP | 2011-144298 A | 7/2011 |
| JP | 2012-184334 A | 9/2012 |

(Continued)

*Primary Examiner* — Manish S Shah
(74) *Attorney, Agent, or Firm* — Harness, Dickey & Pierce, P.L.C.

(57) ABSTRACT

An ink jet ink composition functioning as a water-based magenta ink includes an azo-based pigment and a 1,2-alkanediol having 4 to 8 carbon atoms. In the ink jet ink composition described above, the azo-based pigment has a volume average particle diameter D50 of 110 nm or less, and a content of the 1,2-alkanediol having 4 to 8 carbon atoms with respect to a total mass of the composition is 3.5 percent by mass or less.

9 Claims, 1 Drawing Sheet

(51) Int. Cl.
*B41J 2/21* (2006.01)
*B41M 5/00* (2006.01)
*C09D 11/38* (2014.01)
*C09D 11/40* (2014.01)

(52) U.S. Cl.
CPC ........ *B41M 5/0023* (2013.01); *B41M 5/0088* (2013.01); *C09D 11/38* (2013.01); *C09D 11/40* (2013.01)

(58) Field of Classification Search
CPC ...... B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

2009/0239996 A1* 9/2009 Saito .................... C09D 11/322 524/556
2009/0308279 A1* 12/2009 Koganehira ......... B41M 5/0023 524/386
2010/0247874 A1* 9/2010 Ishihara ................. C09D 11/38 524/211
2011/0057986 A1* 3/2011 Ikoshi .................... B41J 2/2107 347/100
2011/0199420 A1 8/2011 Roberts et al.
2011/0205291 A1* 8/2011 Yasuda .................. C09D 11/40 347/20
2018/0079921 A1* 3/2018 Okamoto ............. C09D 11/322
2020/0032090 A1* 1/2020 Kumeta ................. B41J 2/2107
2020/0109301 A1* 4/2020 Mizutaki .............. C09D 11/322
2021/0009828 A1 1/2021 Maeda et al.
2021/0214569 A1* 7/2021 Yoda ...................... B41J 2/2107
2021/0222019 A1* 7/2021 Mizutaki ................ B41J 2/2107

FOREIGN PATENT DOCUMENTS

JP 6061008 B1 1/2017
JP 2019-167657 A 10/2019
JP 2021-014535 A 2/2021
JP 2021-105082 A 7/2021

* cited by examiner

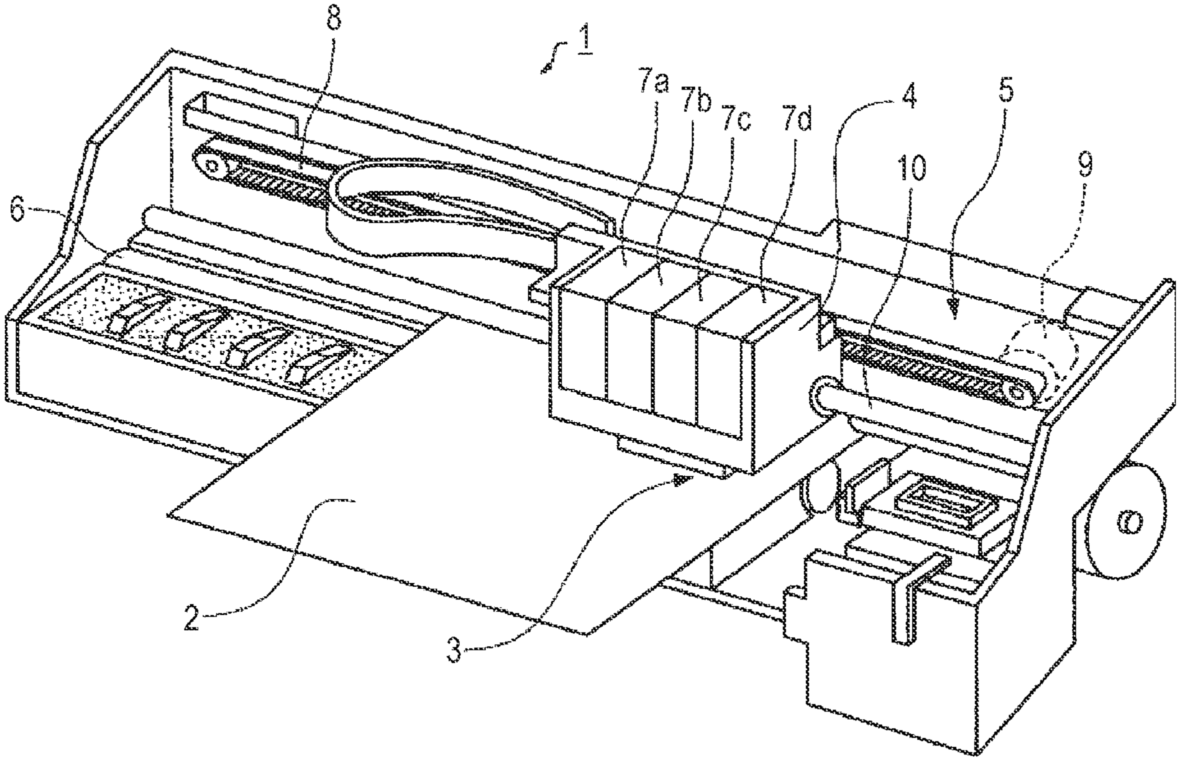
8
1
7a
7b
7c
7d
4
5
10
9
6
2
3

INK JET INK COMPOSITION AND RECORDING METHOD

The present application is based on, and claims priority from JP Application Serial Number 2022-152294, filed Sep. 26, 2022, the disclosure of which is hereby incorporated by reference herein in its entirety.

BACKGROUND

1. Technical Field

The present disclosure relates to an ink jet ink composition and a recording method.

2. Related Art

Ink jet recording has been performed in various types of fields. The ink jet recording has also been positively and actively used for business applications. In business documents, for example, in order to improve the visibility of a red printed portion, printing of an image having high red saturation and color development property in a recorded matter has been required.

For example, JP-A-2021-014535 has disclosed an ink jet recording aqueous ink including a quinacridone pigment which contains a solid solution containing C.I. Pigment Violet 19 and C.I. Pigment Red 202; and an azo pigment which contains C.I. Pigment Red 150. The document described above has also disclosed that while the saturation of this ink from magenta to red (color gamut in a*-b* plane direction) is increased, a recording density (color gamut in an L*-C* direction) is high.

When an azo-based magenta pigment is used in order to improve a red color development property in a recorded matter, various types of problems, such as insufficient color development property, generation of bleeding, generation of curling of a recording medium, and/or inferior dispersion stability of a pigment contained in an ink, may arise.

SUMMARY

According to an aspect of the present disclosure, there is provided an ink jet ink composition which is a water-based magenta ink, the composition comprising: an azo-based pigment and a 1,2-alkanediol having 4 to 8 carbon atoms. In the ink jet ink composition described above, the azo-based pigment has a volume average particle diameter D50 of 110 nm or less, and a content of the 1,2-alkanediol having 4 to 8 carbon atoms with respect to a total mass of the composition is 3.5 percent by mass or less.

According to another aspect of the present disclosure, there is provided a recording method using the ink jet ink composition described above, the method comprising an ink adhesion step of ejecting the ink jet ink composition from an ink jet head so as to be adhered to a recording medium.

BRIEF DESCRIPTION OF THE DRAWINGS

FIGURE is a schematic perspective view showing one example of a recording apparatus which can be used for a recording method.

DESCRIPTION OF EMBODIMENTS

Hereinafter, embodiments of the present disclosure will be described. The following embodiments are to explain examples of the present disclosure. The present disclosure is not at all limited to the following embodiments and also includes various types of changed and/or modified embodiments to be performed without departing from the scope of the present disclosure. In addition, the following constituents are not always required to be essential constituents of the present disclosure.

1. INK JET INK COMPOSITION

An ink jet ink composition of this embodiment is a water-based magenta ink and includes an azo-based pigment and a 1,2-alkanediol having 4 to 8 carbon atoms, the azo-based pigment has a volume average particle diameter D50 of 110 nm or less, and a content of the 1,2-alkanediol having 4 to 8 carbon atoms with respect to a total mass of the composition is 3.5 percent by mass or less.

Even when an azo-based magenta pigment is used in order to improve a red color development property in a recorded matter, if a permeability (in particular, a spreadability in a lateral direction) of an ink to a recording medium is inferior, the state in which the surface of the recording medium is not all covered with the ink may occur, and as a result, white spots may unfavorably appear in some cases. In addition, when the white spots appear, the saturation of an image also tends to be degraded, and hence, a sufficient performance of the azo-based pigment is difficult to realize. In addition, a problem of generation of bleeding of the image may also arise.

In addition, in order to further improve the ink color development property, a method may also be considered in which besides the use of the azo-based magenta pigment, an ejection amount (adhesion amount) of the ink is increased, and/or a pigment having a larger particle diameter is used.

However, when the ejection amount of the ink to a recording medium is increased, although improvement in saturation and white-spot suppression of the image may be expected to a certain extent, as the ejection amount of the ink is increased, generation of curling of the recording medium may be concerned. In addition, when the particle diameter of the pigment is increased, a dispersion stability of the ink is degraded, and as a result, printing irregularity may be unfavorably generated thereby in some cases.

Furthermore, when the ejection amount of the ink is decreased, since a consumption amount of the ink is decreased, the ink is to be stored for a longer period of time in an ink container or a tank of a printer. Hence, the components, such as the pigment, in the ink are liable to be precipitated, and this phenomenon is also concerned.

Under the circumstances as described above, there has been required an ink jet ink composition which is able to form an image having preferable saturation and color development property and which is also able to suppress precipitation of a pigment component of the ink and generation of curling of a recording medium.

1.1. Azo-Based Pigment

The ink jet ink composition of this embodiment includes an azo-based pigment. As the azo-based pigment, for example, a monoazo pigment, a disazo pigment, a condensed disazo pigment, or a benzimidazolone pigment may be mentioned.

As the azo-based pigment, a pigment which is an azo pigment and which enables an ink jet ink composition to function as a magenta ink may be used. As a concrete example of the azo-based pigment, there may be mentioned C.I. Pigment Red 5, 17, 22, 31, 48:1, 48:2, 53:1, 57:1, 146, 185, 114, 146, 150, 170, 184, 208, 245, 268, 269, or a solid solution of one of those mentioned above.

Among the examples mentioned above, when the azo-based pigment is selected from C.I. Pigment Red 150, 269, 17, and solid solutions thereof, an image having a more excellent color development property can be preferably obtained.

In addition, as one example of the azo-based pigment, a pigment represented by the following formula (I) is also preferably mentioned.

[Chem. 1]

(I)

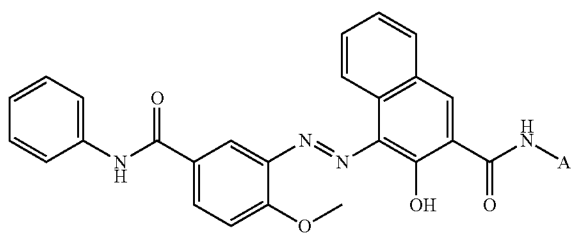

In the formula (I), A represents a hydrogen atom or an aromatic group.

In addition, as the aromatic group, a group having an aromatic ring, such as a benzene ring or a naphthalene ring, may be mentioned, and the aromatic ring may be either substituted or unsubstituted. In addition, the aromatic ring is directly bonded to a nitrogen atom to which the aromatic group is bonded. Furthermore, when the aromatic ring has a substituent, the substituent is not particularly limited and may be, for example, an organic group or an inorganic group, and the number of substituents is also arbitrarily selected. Although the substituent is not limited, for example, an alkyl group, a halo group, an alkoxy group, a hydroxy group, a carboxy group, an amino group, or a nitro group may be mentioned.

Since the azo-based pigment is selected from the pigment having the chemical structure represented by the above formula (I) and the solid solution thereof, an image having a further excellent color development property can be obtained.

As the azo-based pigment, although a resin dispersion pigment in which the pigment is dispersed by a resin which will be described later or a self-dispersible pigment in which a functional group is introduced on a pigment surface by a treatment may be used, the resin dispersion pigment is preferable.

The volume average particle diameter D50 of the azo-based pigment is 110 nm or less. The volume average particle diameter D50 of the azo-based pigment can be measured by a particle size distribution measurement device. As the particle size distribution measurement device, for example, a particle size distribution meter (such as "Nanotrac Series" manufactured by MicrotracBEL Corp.) using a dynamic light scattering method as a measurement principle may be mentioned. The volume average particle diameter is represented as the D50 value.

The volume average particle diameter of the azo-based pigment is preferably 10 to 110 nm, more preferably 50 to 110 nm, even more preferably 80 to 110 nm, further preferably 80 to less than 110 nm, and particularly preferably 80 to 100 nm.

Since the volume average particle diameter of the azo-based pigment is controlled in the range described above, the dispersion stability of the pigment is not only preferable, but the color development property thereof is also more preferable, and the precipitation of the component during the storage can be further suppressed.

The volume average particle diameter of the azo-based pigment may be controlled, for example, such that the degree of pulverization in a pulverization step to pulverize pigment particles is adjusted, that is, for example, such that the intensity and/or the time of the pulverization may be adjusted. In addition, in a dispersion step in which the pigment particles are dispersed in a dispersion liquid, the volume average particle diameter described above may also be controlled such that intensity and/or the time of stirring is adjusted. In addition, after the azo-based pigment is pulverized and/or dispersed, the particle diameter of the pigment may be controlled by classification using a filter.

Since containing the azo-based pigment described above, the ink composition of this embodiment is able to function as an ink having an excellent color development property. Hence, an adhesion amount of the ink necessary to obtain an excellent color development property can be decreased. As a result, since the consumption of the ink is decreased, the ink tends to be stored in an ink container for a long period of time. Even in the case as described above, since the volume average particle diameter of the azo-based pigment is controlled in the range described above, the dispersion stability of the pigment is not only preferable, but the color development property thereof is also more preferable, and the precipitation of the component during the storage can be further suppressed.

A content of the azo-based pigment with respect to a total mass of the composition is preferably 1 percent by mass or more, more preferably 1 to 10 percent by mass, even more preferably 3 to 8 percent by mass, further preferably 3 to 7 percent by mass, even further preferably 5 to 7 percent by mass, and particularly preferably 5.5 to 7 percent by mass. Since the content of the azo-based pigment is in the range described above, an image having a further excellent color development property can be obtained.

1.2. 1,2-Alkanediol Having 4 to 8 Carbon Atoms

The ink jet ink composition according to this embodiment contains a 1,2-alkanediol having 4 to 8 carbon atoms. In this specification, the 1,2-alkanediol having 4 to 8 carbon atoms may be called "specific organic solvent" or "specific permeating agent" in some cases. The specific organic solvent is able to contribute to the permeability of the ink jet ink composition into a recording medium. When the ink jet ink composition is adhered to a recording medium, in particular, the specific organic solvent has a function to further improve the permeability of the ink in a direction along a plane surface of the recording medium. As an example of the specific organic solvent, 1,2-butanediol, 1,2-pentanediol, 1,2-hexanediol, 1,2-heptanediol, or 1,2-octanediol may be mentioned. In addition, although the specific organic solvent may have a branch at an alkane portion, the alkane portion more preferably has a linear structure.

In the ink jet ink composition according to this embodiment, a content of the 1,2-alkanediol having 4 to 8 carbon atoms with respect to the total mass of the composition is 3.5 percent by mass or less. Since the content of the 1,2-alkanediol having 4 to 8 carbon atoms is in the range described above, a lateral spreadability of dots on a recording medium can be improved, the saturation and the color development property of the pigment can be made sufficiently preferable, and as a result, an image excellent in saturation and white-spot suppression can be obtained.

The content of the 1,2-alkanediol having 4 to 8 carbon atoms (specific organic solvent) in the ink jet ink composition with respect to the total mass thereof is preferably 0.5 to 3.5 percent by mass, more preferably 1.0 to 3.5 percent by mass, even more preferably 1.3 to 3.5 percent by mass, further preferably 1.5 to 3.0 percent by mass, and particularly preferably 1.7 to 2.5 percent by mass.

When the content of the specific organic solvent is in the range described above, the spreadability of the ink jet ink composition on a recording medium can be made more appropriate, the saturation and the white-spot suppression of an image are excellent, and in addition, bleeding and/or color mixing are more unlikely to be generated in the image. In addition, when the content of the specific organic solvent is more than the range described above, in the image, ink droplets adjacent to each other are promoted to be gathered together, and hence, the bleeding and/or the color mixing may be generated in some cases.

1.3. Water

The ink jet ink composition according to this embodiment is a water-based magenta ink. A "water-based" compound indicates a compound containing water as one primary solvent component. Accordingly, recording having reduced environmental loads, such as less odor, can be performed.

The water is contained as a primary solvent component of the ink jet ink composition and is a component to be evaporated and scattered by drying. As the water, pure water, such as ion exchange water, ultrafiltration water, reverse osmosis water, or distilled water, or water, such as ultrapure water, in which ionic impurities are removed as much as possible is preferable. In addition, in the case in which water sterilized, for example, by UV radiation or addition of hydrogen peroxide is used, when the ink jet ink composition is stored for a long period of time, generation of fungi and bacteria can be preferably suppressed. A content of the water with respect to the total mass of the ink jet ink composition is preferably 45 percent by mass or more, more preferably 50 to 98 percent by mass, even more preferably 55 to 95 percent by mass, further preferably 65 to 90 percent by mass, and particularly preferably 70 to 85 percent by mass. When the content of the water is in the range described above, a drying property of the ink is made excellent, and an image of a recorded matter can be preferably prevented from being contaminated by rubbing. On the other hand, although curling of the recorded matter is liable to be generated, since the ink of this embodiment is excellent in color development property, the ink adhesion amount can be decreased, and hence, the generation of curling can be effectively suppressed. When the content of the water is set to the range described above or lower than that, the generation of curling can be preferably suppressed.

1.4. Other Components

1.4.1. Betaine Compound

The ink jet ink composition of this embodiment may further contain a betaine compound. Although the betaine compound is not particularly limited, for example, there may be mentioned a tertiary betaine, such as dimethylglycine, dimethylalanine, dimethylglutaric acid, or diethylglycine; or a quaternary betaine, such as trimethylglycine, trimethylalanine, trimethylglutaric acid, or triethylglycine. Among those mentioned above, a quaternary betaine is preferable, and trimethylglycine is more preferable. Since the betaine as described above is used, an effect to suppress the curling of a recording medium can be enhanced. The effect to suppress the curling is significant, in particular, when secondary curling (permanent curling) occurs. In addition, the betaine may be used alone, or at least two types thereof may be used in combination.

In addition, when the betaine compound is contained, although primary curling (curling generated immediately after the ink adhesion) of a recording medium is also likely to be suppressed, because of the generation of the primary curling, sheets discharged and stacked on a tray are not neatly received therein and are protruded therefrom in some cases, and hence, in view of stacking property, a decrease of the ink adhesion amount is more effective.

When the betaine compound is contained in the ink jet ink composition, a content of the betaine compound with respect to the total mass thereof is preferably 1 to 15 percent by mass, more preferably 2 to 10 percent by mass, even more preferably 3 to 8 percent by mass, and further preferably 4 to 6 percent by mass. When the content of the betaine compound is in the range as described above, the effect to suppress the secondary curling of a recording medium can be made more excellent.

1.4.2. Other Organic Solvents

The ink jet ink composition of this embodiment may also contain at least one of other organic solvents. The organic solvent as described above preferably has a water solubility. As one function of the organic solvent, improvement in wettability of the ink jet ink composition to a recording medium and/or enhancement in moisture retaining property of the ink jet ink composition may be mentioned.

As the organic solvent, for example, an ester, an alkyleneglycol ether, a cyclic ester, a nitrogen-containing solvent, or a polyvalent alcohol may be mentioned. As the nitrogen-containing solvent, for example, a cyclic amide or an acyclic amide may be mentioned. As the acyclic amide, for example, an alkoxyalkylamide may be mentioned.

As the ester, there may be mentioned a glycol monoacetate, such as ethylene glycol monomethyl ether acetate, ethylene glycol monoethyl ether acetate, or ethylene glycol monobutyl ether acetate; or a glycol diester, such as ethylene glycol diacetate, diethylene glycol diacetate, or propylene glycol diacetate.

As the alkylene glycol ether, a monoether or a diether of an alkylene glycol may be used, and an alkyl ether is preferable. As a concrete example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, triethylene glycol monoethyl ether, or triethylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, or triethylene glycol diethyl ether.

As the cyclic ester, there may be mentioned a cyclic ester (lactone), such as β-propiolactone, γ-butyrolactone, δ-valerolactone, ε-caprolactone, or β-butyrolactone, or a compound in which a hydrogen atom of a methylene group adjacent to the carbonyl group of one of those mentioned above is replaced by an alkyl group having 1 to 4 carbon atoms.

As the alkoxyalkylamide, for example, there may be mentioned 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, or 3-n-butoxy-N,N-methylethylpropionamide.

As the cyclic amide, a lactam may be mentioned, and for example, there may be mentioned a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone. Those amides mentioned above are preferable in terms of solubility of an aggregating agent and promotion of film formation of resin particles which will be described later, and in particular, 2-pyrrolidone is more preferable.

In addition, as the alkoxyalkylamide, a compound represented by the following general formula (1) is preferably used.

$$R^1—O—CH_2CH_2—(C{=}O)—NR^2R^3 \quad (1)$$

In the above formula (1), $R^1$ represents an alkyl group having 1 to 4 carbon atoms, $R^2$ and $R^3$ each independently represent a methyl group or an ethyl group. As the "alkyl group having 1 to 4 carbon atoms", a linear or branched alkyl group may be used, and for example, a methyl group, an ethyl group, an n-propyl group, an iso-propyl group, an n-butyl group, a sec-butyl group, an iso-butyl group, or a tert-butyl group may be mentioned. The compound represented by the above formula (1) may be used alone, or at least two types thereof may be used after being mixed together.

As the function of the nitrogen-containing solvent, for example, improvement in surface drying property and fixing property of a white ink composition adhered to a low-absorbing recording medium may be mentioned. In particular, the compound represented by the above formula (1) has an excellent function to soften and/or dissolve a vinyl chloride-based resin. Hence, the compound represented by the above formula (1) softens and/or dissolves a recording surface containing a vinyl chloride-based resin and enables a white ink composition to permeate in a low-absorbing recording medium. Since the white ink composition is able to permeate in the low-absorbing recording medium as described above, the white ink composition is tightly fixed, and the surface thereof is likely to be dried. Accordingly, an image to be obtained is likely to have excellent surface drying property and fixing property.

Although a content of the nitrogen-containing solvent with respect to a total mass of the white ink composition is not particularly limited, the content described above is approximately 5 to 50 percent by mass and preferably 10 to 30 percent by mass. When the content described above is in the range described above, the fixing property of an image and the surface drying property thereof (in particular, a surface drying property when the recording is performed in an environment at a high temperature and a high humidity) may be further improved in some cases.

As the polyvalent alcohol, for example, there may be mentioned a polyvalent alcohol (polyol) other than a 1,2-alkanediol, such as diethylene glycol, triethylene glycol, dipropylene glycol, 1,3-propanediol, 1,3-butanediol (alias: 1,3-butylene glycol), 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, or glycerin.

The polyol is a polyol of an alkane having 4 carbon atoms or less or an intermolecular condensate between hydroxy groups of polyols each having 4 carbon atoms or less. The number of carbon atoms of the alkane is preferably 2 to 3. The number of hydroxy groups in a polyol molecule is 2 or more, preferably 5 or less, and more preferably 3 or less. When the polyol is the intermolecular condensate described above, the number of intermolecular condensations is 2 or more, preferably 4 or less, and more preferably 3 or less. The polyvalent alcohol may be used alone, or at least two types thereof may be used after being mixed together.

When the ink jet ink composition contains at least one of other organic solvents, the other organic solvents may be used alone, or at least two types thereof may be used in combination. In addition, a total content of the other organic solvents with respect to the total mass of the ink jet ink composition is, for example, 5 to 50 percent by mass, preferably 10 to 45 percent by mass, more preferably 15 to 40 percent by mass, and further preferably 20 to 40 percent by mass. Since the content of the organic solvent is in the range described above, the wet spreadability and the drying property are more well-balanced, and an image having a high quality is more likely to be formed.

The content of all the organic solvents including the specific organic solvent described above contained in the ink jet ink composition may also be preferably set in the range described above.

1.4.3. Surfactant

The ink jet ink composition of this embodiment may also contain a surfactant. The surfactant has a function to adjust a surface tension of the ink jet ink composition, and hence, for example, the wettability to a recording medium may be adjusted. Among the surfactants, for example, an acetylene glycol-based surfactant, a silicone-based surfactant, or a fluorine-based surfactant may be preferably used.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products and Chemicals Inc.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

Although the silicone-based surfactant is not particularly limited, a polysiloxane-based compound is preferably mentioned. Although the polysiloxane-based compound is not particularly limited, for example, a polyether-modified organosiloxane may be mentioned. As a commercial product of the polyether-modified organosiloxane, for example, there may be mentioned BYK-306, BYK-307, BYK-333, BYK-341, BYK-345, BYK-346, or BYK-348 (trade name, manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin- Etsu Chemical Co., Ltd.); or Silface SAG002, 005, 503A, or 008 (trade name, manufactured by Nisshin Chemical Industry Co., Ltd.).

As the fluorine-based surfactant, a fluorine modified polymer is preferably used, and as a concrete example, for example, BYK-3440 (manufactured by BYK Japan KK); Surflon S-241, S-242, or S-243 (trade name, manufactured by AGC Seimi Chemical Co., Ltd.); or Ftergent 215 M (manufactured by Neos Co., Ltd.) may be mentioned.

When the surfactant is contained in the ink jet ink composition, at least two types thereof may be contained. A content of the surfactant contained in the ink jet ink composition with respect to the total mass thereof is 0.1 to 2 percent by mass, preferably 0.4 to 1.5 percent by mass, and more preferably 0.5 to 1.0 percent by mass.

1.4.4. Resin

The ink jet ink composition of this embodiment may also contain a resin, such as a resin dispersant or resin particles.

Resin Dispersant

An azo-based pigment which can be stably dispersed in a dispersion medium is preferable, and hence, a dispersant may be used for the stable dispersion. As the dispersant, a resin dispersant may be mentioned, and at least one of resin dispersants which enable an azo-based pigment to have a preferable dispersion stability may be appropriately selected.

As the resin dispersant (dispersant resin), there may be mentioned a (meth)acrylic-based resin, such as a poly(meth) acrylic acid, a (meth)acrylic acid-acrylonitrile copolymer, a (meth)acrylic acid-(meth)acrylate copolymer, a vinyl acetate-(meth)acrylate copolymer, a vinyl acetate-(meth) acrylic acid copolymer, a vinylnaphthalene-(meth)acrylic acid copolymer, or its salt; a styrene-based resin, such as a styrene-(meth)acrylic acid copolymer, a styrene-(meth) acrylic acid-(meth)acrylate copolymer, a styrene-α-metylstyrene-(meth)acrylic acid copolymer, a styrene-α-metylstyrene-(meth)acrylic acid-(meth)acrylate copolymer, a styrene-maleic acid copolymer, or a styrene-maleic anhydride copolymer, or its salt; an urethane-based resin or its salt, the urethane-based resin being a linear and/or a branched high molecular weight compound (resin) which includes an urethane bond formed by a reaction between an isocyanate group and a hydroxy group and which may have or not have a cross-linking structure; a poly(vinyl alcohol); a vinylnaphthalene-maleic acid copolymer or its salt; a vinyl acetate-maleate copolymer or its salt; or a water-soluble resin, such as a vinyl acetate-crotonic acid copolymer or its salt. Among those mentioned above, a copolymer between a monomer having a hydrophobic functional group and a monomer having a hydrophilic group or a polymer formed from a monomer having both a hydrophobic functional group and a hydrophilic group is preferable. As the form of the copolymer, any form selected from a random copolymer, a block copolymer, an alternate copolymer, and a graft copolymer may be used.

As a commercial product of the styrene-based resin dispersant, for example, there may be mentioned X-200, X-1, X-205, X-220, or X-228 (manufactured by Seiko PMC Corporation); Nopco Sperse (registered trademark) 6100 or 6110 (manufactured by San Nopco Limited.); Joncryl 67, 586, 611, 678, 680, 682, or 819 (manufactured by BASF); DISPERBYK-190 (manufactured by BYK Japan KK); or N-EA137, N-EA157, N-EA167, N-EA177, N-EA197D, N-EA207D, or E-EN10 (manufactured by DKS Co., Ltd.).

In addition, as a commercial product of the acrylic-based resin dispersant, for example, there may be mentioned BYK-187, BYK-190, BYK-191, BYK-194N, or BYK-199 (manufactured by BYK Japan KK); or Aron A-210, A6114, AS-1100, AS-1800, A-30SL, A-7250, or CL-2 (manufactured by Toagosei Company, Limited).

Furthermore, as a commercial product of the urethane-based resin dispersant, for example, there may be mentioned BYK-182, BYK-183, BYK-184, or BYK-185 (manufactured by BYK Japan KK); TEGO Disperse 710 (manufactured by Evonic Tego Chemi); or Borchi (registered trademark) Gen 1350 (manufactured by OMG Borschers).

The resin dispersant may be used alone, or at least two types thereof may be used in combination. A total content of the dispersant with respect to 50 parts by mass of the pigment is preferably 0.1 to 30 parts by mass, more preferably 0.5 to 25 parts by mass, even more preferably 1 to 20 parts by mass, and further preferably 1.5 to 15 parts by mass. Since the content of the dispersant with respect to 50 parts by mass of the pigment is 0.1 parts by mass or more, the dispersion stability of the pigment can be further improved. In addition, when the content of the dispersant with respect to 50 parts by mass of the pigment is 30 parts by mass or less, the viscosity of an obtained dispersion can be suppressed to be low.

Among the dispersants described above by way of example, at least one selected from anionic dispersant resins is more preferable. In addition, in the case described above, a weight average molecular weight of the dispersant is preferably 500 or more, more preferably 5,000 to 100,000, and further preferably 10,000 to 50,000.

Resin Particles

The ink jet ink composition according to this embodiment may also contain resin particles. The resin particles are able to further improve, for example, the adhesion of an image formed by the ink jet ink composition adhered to a recording medium.

As the resin particles, there may be mentioned resin particles formed, for example, from an urethane-based resin, an acrylic-based resin (including a styrene-acrylic-based resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, or an ethylene-vinyl acetate-based resin. Among those mentioned above, an urethane-based resin, an acrylic-based resin, a polyolefin-based resin, or a polyester-based resin is preferable. Although being frequently handled in the form of an emulsion, those resin particles may also be handled in the form of a powder. In addition, the types of resin particles may be used alone, or at least two types thereof may be used in combination.

The urethane-based resin is a generic name of resins each having an urethane bond. As the urethane-based resin, there may be used a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond. In addition, as the urethane-based resin, a commercial product may also be used, and for example, a commercial product selected from Superflex 420, 460, 460s, 840, and E-4000 (trade name, manufactured by DKS Co., Ltd.); Resamine D-1060, D-2020, D-4080, D-4200, D-6300, and D-6455 (trade name, manufactured by Dainichiseika Color & Chemicals Mfg. Co., Ltd.); Takelac WS-6021 and W-512-A-6 (trade name, manufactured by Mitsui Chemicals & Polyurethanes, Inc.); Suncure 2710 (trade name, manufactured by LUBRIZOL); and Permarine UA-150 (trade name, manufactured by Sanyo Chemical Industries, Ltd.) may be used.

The acrylic-based resin is a generic name of polymers each obtained by polymerizing at least one acrylic-based monomer, such as (meth)acrylic acid or a (meth)acrylic acid ester, as one component, and for example, a resin obtained from an acrylic-based monomer or a copolymer obtained by copolymerization between an acrylic-based monomer and another monomer may be mentioned. For example, an acrylic vinyl-based resin which is a copolymer between an acrylic-based monomer and a vinyl-based monomer may be mentioned. In addition, for example, as the vinyl-based monomer, styrene may be mentioned.

As the acrylic-based monomer, for example, acrylamide or acrylonitrile may also be used. As a resin emulsion formed using an acrylic-based resin as a raw material, a commercial product may also be used, and for example, a commercial product selected from FK-854 (trade name, manufactured by Chuorika Kougyo Co., Ltd.); Movinyl 952B and 718A (trade name, manufactured by Nippon Synthetic Chemical Industry Co., Ltd.); and Nipol LX852 and LX874 (trade name, manufactured by Zeon Corporation) may be used.

In addition, in this specification, the acrylic-based resin may also include a styrene-acrylic-based resin which will be described later. In addition, in this specification, (meth) acrylic indicates acrylic and/or methacrylic.

The styrene-acrylic-based resin is a copolymer obtained from a styrene monomer and a (meth)acrylic-based monomer, and for example, there may be mentioned a styrene-acrylic acid copolymer, a styrene-methacrylic acid copolymer, a styrene-methacrylic acid-acrylate copolymer, a styrene-α-methylstyrene-acrylic acid copolymer, or a styrene-α-methylstyrene-acrylic acid-acrylate copolymer. As the styrene-acrylic-based resin, a commercial product may also be used, and for example, Joncryl 62J, 7100, 390, 678, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); Movinyl 966A or 975N (trade name, manufactured by Nippon Synthetic Chemical Industry Co., Ltd.): or Vinyblan 2586 (manufactured by Nisshin Chemical Industry Co., Ltd.), may be used.

The polyolefin-based resin is a resin having a structural skeleton of an olefin, such as ethylene, propylene, or butylene, and one appropriately selected from known polyolefin-based resins may be used. As the polyolefin-based resin, a commercial product may also be used, and for example, Arrowbase CB-1200 or CD-1200 (trade name, manufactured by Unitika Ltd.) may be used.

In addition, the resin particles may be supplied in the form of an emulsion, and as an example of a commercial product of the resin emulsion as described above, for example, the commercial product may be selected from Microgel E-1002 and E-5002 (trade name, styrene-acrylic-based resin emulsion, manufactured by Nippon Paint Co., Ltd.); Voncoat 4001 (trade name, acrylic-based resin emulsion, manufactured by DIC Corporation); Voncoat 5454 (trade name, styrene-acrylic-based resin emulsion, manufactured by DIC Corporation); Polysol AM-710, AM-920, AM-2300, AP-4735, AT-860, and PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene-vinyl acetate resin emulsion), and Polysol PSASE-6010 (ethylene/vinyl acetate resin emulsion) (trade name, manufactured by Showa Denko K.K.); Polysol SAE1014 (trade name, styrene-acrylic-based resin emulsion, manufactured by Zeon Corporation); Saivinol SK-200 (trade name, acrylic-based resin emulsion, manufactured by Saiden Chemical Industry Co., Ltd.); AE-120A (trade name, acrylic resin emulsion, manufactured by JSR Corporation); AE373D (trade name, carboxy-modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), and Vinyblan 5202 (acetic acid-acrylic resin emulsion) (trade name, manufactured by Nisshin Chemical Industry Co., Ltd.); Elitel KA-5071S, KT-8803, KT-9204, KT-8701, KT-8904, and KT-0507 (trade name, polyester resin emulsion, manufactured by Unitika Ltd.); Hitec SN-2002 (trade name, polyester resin emulsion, manufactured by Toho Chemical Industry Co., Ltd.); Takelac W-6020, W-635, w-6061, W-605, and W-6021 (trade name, urethane-based resin emulsion, manufactured by Mitsui Chemicals Polyurethane); Superflex 420, 870, 800, 150, 420, 460, 470, 610, and 700 (trade name, urethane-based resin emulsion, manufactured by DKS Co., Ltd.): Permarine UA-150 (trade name, urethane-based resin emulsion, manufactured by Sanyo Chemical Industries, Ltd.); Suncure 2710 (trade name, urethane-based resin, manufactured by Lubrizol Japan Ltd.); NeoRez R-9660, R-9637, and R-940 (trade name, urethane-based resin emulsion, manufactured by Kusumoto Chemicals, Ltd.); Adekabontighter HUX-380 and 290K (trade name, urethane-based resin emulsion, manufactured by ADEKA Corporation); Movinyl 966A and Movinyl 7320 (trade name, manufactured by Nippon Synthetic Chemical Industry Co., Ltd.); Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade name, manufactured by BASF); NK Binder R-5HN (trade name, manufactured by Shin-Nakamura Chemical Co., Ltd.); and Hydran WLS-210 (trade name, non-crosslinked polyurethane, manufactured by DIC Corporation).

The volume average particle diameter of the resin particles is preferably 10 to 300 nm, more preferably 30 to 300 nm, even more preferably 30 to 250 nm, and further preferably 40 to 220 nm. The volume average particle diameter can be measured by the method described above.

A content of the resin particles in the ink jet ink composition with respect to the total mass thereof is as a solid content, 0.1 to 20 percent by mass, preferably 1 to 15 percent by mass, and more preferably 2 to 10 percent by mass.

1.4.5. Additives

The ink jet ink composition according to this embodiment may also contain, as an additive, an urea, an amine, and/or a saccharide. As the urea, for example, urea, ethyleneurea, tetramethylurea, thiourea, or 1,3-dimethyl-2-imidazolidinone may be mentioned, and a betaine (such as trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, or acetylcarnitine) may also be mentioned.

As the amine, for example, diethanolamine, triethanolamine, or triisopropanolamine may be mentioned. The urea and the amine may also be used to function as a pH adjuster or an alkaline agent.

As the saccharide, for example, there may be mentioned glucose, mannose, fructose, ribose, xylose, arabinose, galactose, aldonic acid, glucitol (sorbitol), maltose, cellobiose, lactose, sucrose, trehalose, or maltotriose.

Furthermore, the ink jet ink composition according to this embodiment may also contain, if needed, components, such as an antiseptic/fungicide agent, an antirust agent, a chelating agent, a viscosity adjuster, an antioxidant, an antifungal agent, and/or a wax. In addition, as long as the effect which will be described later is not disturbed, the ink jet ink composition according to this embodiment may also contain, if needed, a colorant other than the azo-based pigment.

1.5. Applications and the Like

As a recording medium to which the ink jet ink composition according to this embodiment is adhered, the following may be mentioned. The recording medium may either include or not include a recording surface to absorb an ink. Hence, the recording medium is not particularly limited, and for example, a liquid absorbing recording medium, such as paper, a film, or a cloth, a liquid low-absorbing recording medium, such as printing paper, or a liquid non-absorbing recording medium, such as a metal, a glass, or a high molecular weight material, may be mentioned.

The liquid low-absorbing or the liquid non-absorbing recording medium indicates a recording medium which hardly absorbs an ink or which absorbs no ink at all, respectively. In a quantitative point of view, the liquid non-absorbing or the liquid low-absorbing recording medium indicates "a recording medium having a water absorption amount of 10 $mL/m^2$ or less from a contact start to 30 $mseconds^{1/2}$ measured by Bristow method". This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000. On the other hand, the liquid absorbing recording medium indicates a recording medium corresponding to neither the liquid non-absorbing recording medium nor the liquid low-absorbing recording medium. In addition, in this specification, the liquid low-absorbing recording medium and the liquid non-absorbing recording medium may be simply called a low-absorbing recording medium and a non-absorbing recording medium, respectively.

As the liquid non-absorbing recording medium, for example, a medium in which a plastic is coated on a substrate such as paper, a medium in which a plastic film is adhered to a substrate such as paper, or a plastic film having no absorbing layer (receiving layer) may be mentioned. As the plastic in this case, for example, there may be mentioned a poly(vinyl chloride), a poly(ethylene terephthalate), a polycarbonate, a polystyrene, a polyurethane, a polyethylene, or a polypropylene.

In addition, as the liquid low-absorbing recording medium, for example, a recording medium in which a liquid low-absorbing coating layer is provided on a substrate surface may be mentioned. For example, so-called coating paper may be mentioned. For example, as coating paper having a substrate made of paper, printing paper, such as art paper, coated paper, or mat paper, may be mentioned, and as coating paper having a substrate made of a plastic film, for example, there may be mentioned paper in which a plastic surface formed, for example, from a poly(vinyl chloride), a poly(ethylene terephthalate), a polycarbonate, a polystyrene, a polyurethane, a polyethylene, or a polypropylene is coated, for example, with a polymer or is coated with particles of silica, titanium, or the like together with a binder.

As the recording medium, a liquid absorbing recording medium may also be used. The liquid absorbing recording medium indicates a "recording medium having a water absorption amount of more than 10 $mL/m^2$ from a contact start to 30 $mseconds^{1/2}$ by Bristow method".

As the liquid absorbing recording medium, there may be mentioned a liquid absorbing recording medium formed by providing a receiving layer to absorb a liquid on a substrate surface. For example, ink jet paper (ink jet exclusive paper) may be mentioned. As the receiving layer to absorb a liquid, a layer formed, for example, from a liquid absorbing resin or liquid absorbing inorganic particles may be mentioned.

As the liquid absorbing recording medium, a recording medium in which its substrate itself has a liquid absorbing property may also be mentioned. For example, a cloth formed from fibers or paper containing pulp as a component may be mentioned. As the paper, for example, regular paper, cardboard, or linerboard may be mentioned. As the linerboard, a board formed from craft pulp or paper, such as waste paper, may be mentioned.

Since the ink jet ink composition according to this embodiment is used for recording on the absorbing recording medium, a more excellent effect can be obtained. That is, even when an absorbing recording medium, such as regular paper, which is liable to cause curling and ink permeation is used, the saturation and the color development property of an image to be obtained are preferable, the bleeding thereof can be suppressed, and the precipitation of the component and the curling of the recording medium can be suppressed; hence, a more significant effect can be realized.

1.6. Preparation and Physical Properties

When the components described above are mixed together in an arbitrary order, and if needed, impurities are then removed by filtration or the like, the ink jet ink composition according to this embodiment can be obtained. As a mixing method of the components described above, a method in which after the components are sequentially charged in a container equipped with a stirring device, such as a mechanical stirrer or a magnetic stirrer, stirring and mixing are performed is preferably used. As a filtration method, a centrifugal filtration, a filter filtration, or the like may be preformed, if needed.

The ink jet ink composition is adhered to a recording medium by an ink jet method. Hence, a viscosity of the ink jet ink composition at 20° C. is preferably set to 1.5 to 15 mPa·s, more preferably set to 1.5 to 7 mPa·s, and further preferably set to 1.5 to 5.5 mPa·s. When the ink jet ink composition has a viscosity in the range described above and is adhered to a recording medium by an ink jet method, a predetermined image can be efficiently and more easily formed on the recording medium.

In order to obtain a more appropriate wet spreadability on a recording medium, a surface tension of the ink jet ink composition at 25° C. is preferably 40 mN/m or less, more preferably 38 mN/m or less, even more preferably 35 mN/m or less, and further preferably 30 mN/m or less. In addition, the surface tension described above is preferably 20 mN/m or more and more preferably 25 mN/m or more. In addition, the surface tension can be measured using an automatic surface tensiometer CBVP-Z (manufactured by Kyowa Interface Science Co., Ltd.) in a manner such that a surface tension obtained when a platinum plate is wetted with the composition in an environment at a temperature of 25° C. is confirmed.

1.7. Mechanism, Effect, and the Like

According to the ink jet ink composition of this embodiment, the saturation and the color development property of an image to be obtained are preferable, the bleeding thereof can be suppressed, and the precipitation of the component and the curling of a recording medium can be suppressed. According to this ink composition, since the azo-based pigment is used, a magenta ink color is obtained, and in addition, an image having a higher red saturation, a high red color reproducibility, and a higher red color development property can be recorded.

The ink jet ink composition of this embodiment is a magenta ink. The magenta ink indicates an ink to be used for recording as an ink set together with a cyan ink and a yellow ink, and if needed, also together with a black ink. Among commercially available inks, although not particularly limited, the magenta ink includes, for example, all types of inks, such as an ink generally named a magenta ink and an ink naturally considered as a magenta ink.

The magenta ink according to this embodiment preferably satisfies the following conditions. That is, after an image is formed by adhering a minimum amount of the ink composition on the entire surface of a white IJ recording medium (such as photographic paper (gloss), manufactured by Seiko Epson Corporation) so as not to allow the recording medium to have an uncovered portion, when color measurement is performed on the image thus formed at a viewing angle of 2° using a D50 light source by the CIELAV color system in accordance with CIE, the image thus formed preferably has a hue angle ΔH° of 330 to 360. Although a colorimeter used in the above measurement is not particularly limited, for example, Spectrolino manufactured by GretagMacbeth may be mentioned.

In order to improve the color development property and the saturation of a red type color, although an ink set in which a special color ink, such as a red ink, is additionally included may also be considered, in the case described above, the size of a printer is unfavorably increased in consideration of an installation space therefor. From the point as described above, compared to the addition of the special color ink such as a red ink, the improvement in the saturation and the color development property of the magenta ink is preferable. Accordingly, a magenta ink excellent in red color saturation and red color development property can be effectively used.

The magenta ink of this embodiment may form an ink set together with the cyan ink and the yellow ink described above, and if needed, also together with the black ink.

According to the ink composition of this embodiment, since the 1,2-alkanediol having 4 to 8 carbon atoms is contained at a content of 3.5 percent by mass or less with respect to the total mass of the composition, the lateral spreadability of dots on a recording medium can be improved, preferable saturation and color development property of the pigment described above can be sufficiently obtained, and as a result, an image having an excellent saturation and an excellent white-spot suppression can be obtained.

Furthermore, since the pigment and the specific permeating solvent described above are used, without increasing the adhesion amount of the ink, the saturation and the white-spot suppression are preferable, and hence the curling of a recording medium can also be preferably suppressed. In addition, the consumption of the ink can be decreased, and as a result, a printing cost can be reduced.

Furthermore, since the average particle diameter of the pigment is 110 nm or less, even when the consumption of the ink is small, and the ink in a cartridge or a tank is stored for a long period of time, the precipitation of the ink component can be suppressed, and the change in density of an image to be obtained can also be suppressed. In addition, since the azo-based pigment is used, the saturation and the color development property are excellent, and even when the average particle diameter of the pigment is decreased, an image having preferable saturation and color development property can be sufficiently obtained.

2. RECORDING METHOD

2.1. Ink Adhesion Step

A recording method according to this embodiment is a recording method using the ink jet ink composition described above and includes an ink adhesion step of ejecting the ink jet ink composition from an ink jet head so as to be adhered to a recording medium.

As long as the ink jet ink composition is adhered to a recording medium while the ink jet head is scanned thereto, the ink adhesion step may be performed by any method. For example, when the ink jet head is used, and the ink jet ink composition is ejected therefrom, the ink adhesion step can be preferably performed. Accordingly, a small quantity of many types of printing can be efficiently performed using a small-scale apparatus. In addition, an ink jet recording apparatus may be either a serial type or a line type.

An adhesion amount of the ink jet ink composition in the ink adhesion step is preferably 6.0 mg/inch$^2$ or less, more preferably 5.5 mg/inch$^2$ or less, and further preferably 5.0 mg/inch$^2$ or less. Accordingly, the effect to suppress the curling of the recording medium can be more significantly realized, and in addition, an image having a preferable color development property can be obtained.

In addition, a lower limit of the adhesion amount described above is preferably 1.0 mg/inch$^2$ or more, more preferably 2.0 mg/inch$^2$ or more, even more preferably 2.5 mg/inch$^2$ or more, further preferably 3.0 mg/inch$^2$ or more, even further preferably 3.7 mg/inch$^2$ or more, and particularly preferably 4.0 mg/inch$^2$ or more.

The adhesion amount described above may be preferably used as the maximum adhesion amount in the recording method. That is, in the recording method, when the adhesion amount is changed depending on the location in an image to be recorded, the adhesion amount at the location at which the adhesion amount is maximum may be set in the range of the adhesion amount described above.

Since the ink composition of this embodiment contains the azo-based pigment described above, an ink having an excellent color development property can be obtained. Hence, in order to obtain an excellent color development property, the adhesion amount of the ink can be decreased. Accordingly, the adhesion amount of the ink can be preferably set to the range described above or lower than that.

2.2. Other Steps

The recording method of this embodiment may include, for example, a drying step (primary heating step) of drying the ink jet ink composition adhered to the recording medium and a step (post-heating step) of heating the recording medium.

2.3. Recording Apparatus

A recording apparatus which can be used for the recording method of this embodiment is not particularly limited, and any apparatus which includes an ink jet head and a supply flow path to supply the ink jet ink composition to the ink jet head and which can form an image on a recording medium by ejecting the ink composition from the ink jet head may be used. Although a portion to form the supply flow path is not particularly limited, for example, an ink container and other portions may be included.

FIGURE is a schematic perspective view showing one example of a recording apparatus usable in this embodiment. A printer 1 functioning as a recording apparatus includes an ink jet head 3, a carriage 4 mounting the ink jet head 3 and also detachably mounting ink tanks 7*a* to 7*d* each functioning as an ink container, a main scanning mechanism 5 to reciprocally transfer the carriage 4 in a medium width direction, and a platen roller 6 to transfer a recording medium 2 to a platen located in a recording medium transport direction. In addition, the printer 1 has a control portion (not shown) to control the entire operation of the printer 1. In addition, the medium width direction indicates a main scanning direction (head scanning direction), and the medium transport direction indicates a sub-scanning direction (direction orthogonal to the main scanning direction).

The main scanning mechanism 5 includes a timing belt 8 connected to the carriage 4, a motor 9 to drive the timing belt 8, and a guide shaft 10 functioning as a support member provided in the main scanning direction. The carriage 4 is driven by the motor 9 through the timing belt 8 and is reciprocally transferred in the main scanning direction along the guide shaft 10.

In the example shown in FIGURE, the ink tanks 7*a* to 7*d* are formed from four independent ink tanks. In the ink tanks 7*a* to 7*d*, for example, ink jet ink compositions containing a black, a magenta, a cyan, and a yellow pigment are respectively received. In the example shown in FIGURE, although the four ink tanks are shown, the number thereof is not limited thereto, and a desired number of ink tanks can be mounted. From outlet portions (not shown) provided at the bottoms of the ink tanks 7*a* to 7*d* to discharge the inks received therein, the inks are supplied to the ink jet head 3.

The ink jet head 3 includes a flow path (not shown) through which a supplied ink jet ink composition is allowed to flow and a nozzle (not shown) connected thereto to eject the ink. The outlet portion of the ink tank and the ink jet head are connected to each other by an ink supply path or the like, and the ink composition is supplied from the ink tank to the ink jet head. Although being disposed in the carriage in FIGURE, the ink tanks are not limited thereto and may be disposed at a place other than the carriage. In the case described above, the outlet portion of the ink tank and the ink jet head are also connected to each other by the ink supply path. As the ink supply path, any supply path which connects the two components to each other, which allows the ink to pass therethrough, and which can supply the ink between the two components may be used, and for example, an ink tube may be mentioned.

The ink container is, for example, the ink tank described above. As the ink tank, for example, an ink cartridge may be mentioned. The ink cartridge is a component detachably fitted to the ink jet recording apparatus and may be an ink pack or the like.

An ink volume of the ink container is, for example, preferably 50 to 1,000 g, more preferably 100 to 700 g, even more preferably 150 to 500 g, and further preferably 160 to 250 g. When the ink volume is set to the range described above or higher than that, a recording amount recordable by the ink contained in one ink container can be preferably increased. When the ink volume is set to the above range or lower than that, the precipitation of the ink component can be preferably suppressed.

The ink volume is an ink volume when the ink container is started to be used, that is, is an initial ink volume.

Although the other portions are not particularly limited, for example, the ink supply path, a filter, and/or a valve may be mentioned. A relay tank may also be provided at a point along the ink supply path.

In addition, as the recording apparatus of this embodiment, either a serial type or a line type may be used. In those types of recording apparatuses, an ink jet head is mounted, and while a relative positional relationship between a recording medium and the ink jet head is changed, a predetermined volume (mass) of liquid droplets of the ink composition is ejected with predetermined time intervals (intermittently) from a nozzle hole of the ink jet head, and a predetermined image can be formed by adhering the ink composition to the recording medium.

In general, in the serial type recording apparatus, the transport direction of the recording medium and the direction of the reciprocal operation of the ink jet head are intersected to each other, and by the combination between the reciprocal operation of the ink jet head and the transport operation (including the reciprocal operation) of the recording medium, the relative positional relationship between the recording medium and the ink jet head is changed. In addition, in the case described above, in general, a plurality of nozzle holes (holes from which the ink composition is ejected) is disposed in the ink jet head, and a line of nozzle holes (nozzle line) is formed along the transport direction of the recording medium. In addition, in accordance with the types and the number of ink compositions, a plurality of nozzle lines may be formed in the ink jet head in some cases.

In addition, in general, in the line type recording apparatus, the reciprocal operation of the ink jet head is not performed, the relative positional relationship between the recording medium and the ink jet head is changed by the transport of the recording medium. In the case described above, in general, a plurality of nozzle holes is also disposed in the ink jet head, and a line of the nozzle holes (nozzle line) is formed in a direction intersecting the transport direction of the recording medium.

Although a recording system in the ink jet recording apparatus uses the serial type or the line type recording apparatus as described above, the system is not particularly limited as long as the ink composition can be ejected in the form of liquid droplets from fine nozzle holes and can be adhered to a recording medium. For example, as an ink jet recording system, there may be mentioned an electrostatic suction system, a system to spray ink droplets by a pump pressure, a system using piezoelectric elements, or a system to spray ink droplets by heating and bubbling an ink liquid using microelectrodes.

In addition, although constituents of the recording apparatus used in this embodiment are not particularly limited, for example, known constituents, such as a heating unit, a drying unit, a roll unit, and/or a winding device, may be freely used.

2.4. Operational Effect

According to the recording method of this embodiment, a recorded matter can be obtained in which the saturation and the color development property of an image to be obtained are preferable, the bleeding thereof is suppressed, and the precipitation of the component and the curling of a recording medium is suppressed.

3. EXAMPLES AND COMPARATIVE EXAMPLES

Hereinafter, although the present disclosure will be described in detail with reference to Examples, the present disclosure is not limited thereto. Hereinafter, unless otherwise particularly described, "part(s)" and "%" are each on a mass basis. In addition, unless otherwise particularly described, the evaluation was performed in an environment at a temperature of 25.0° C. and a relative humidity of 40.0%.

3.1. Preparation of Ink

After components were charged in a container so as to have one of the compositions shown in Tables 1 to 3, and mixing and stirring were performed for 2 hours by a magnetic stirrer, filtration using a membrane filter having a pore diameter of 5 µm was performed, so that ink jet ink compositions used in Examples and Comparative Examples were obtained. In addition, the numerical values of the pigment and the resin in the table represent a solid content (*1).

TABLE 1

| | | | EXAMPLE 1 | EXAMPLE 2 | EXAMPLE 3 | EXAMPLE 4 |
|---|---|---|---|---|---|---|
| INK JET INK COMPOSITION | PIGMENT*1 | DISPERSION LIQUID A *2 | 6.0 | 2.0 | 8.0 | 6.0 |
| | | DISPERSION LIQUID B *3 | — | — | — | — |
| | | DISPERSION LIQUID C | — | — | — | — |
| | SPECIFIC PERMEATING AGENT | 1,2-HEXANEDIOL | 2.0 | 2.0 | 2.0 | 1.0 |
| | | 1,2-BUTANEDIOL | — | — | — | — |
| | AMINOCOAT (BETAINE) | | — | — | — | — |
| | OTHER SOLVENTS | Gly | 8.0 | 8.0 | 8.0 | 8.0 |
| | | TEG | 5.0 | 5.0 | 5.0 | 5.0 |
| | | PROPYLENE GLYCOL | — | — | — | — |
| | | TEGmBE | 3.0 | 3.0 | 3.0 | 3.0 |
| | SURFACTANT | OLFINE 1010 | 2.0 | 2.0 | 2.0 | 2.0 |
| | | SURFYNOL 104 | 2.0 | 2.0 | 2.0 | 2.0 |
| | RESIN *1 | SUPERFLEX 420 | 0.5 | 0.5 | 0.5 | 0.5 |
| | ALKALI | TEA | 0.8 | 0.8 | 0.8 | 0.8 |
| | | PURE WATER | BALANCE | BALANCE | BALANCE | BALANCE |
| | | TOTAL | 100 | 100 | 100 | 100 |
| PIGMENT PARTICLE DIAMETER (D50) | | [nm] | 100 | 100 | 100 | 100 |
| INK COATING AMOUNT | | [mg/inch2] | 5 | 5 | 5 | 5 |
| EVALUATION RESULT | RED SATURATION | | A | B | A | A |
| | PRIMARY CURLING ANGLE | | A | A | A | A |
| | SECONDARY CURLING HEIGHT | | A | A | A | A |
| | PRECIPITATION | | A | A | B | A |
| | COLOR DEVELOPMENT PROPERTY | | A | A | A | B |
| | BLEEDING | | AA | AA | AA | B |

| | | | EXAMPLE 5 | EXAMPLE 6 | EXAMPLE 7 | EXAMPLE 8 |
|---|---|---|---|---|---|---|
| INK JET INK COMPOSITION | PIGMENT*1 | DISPERSION LIQUID A *2 | 6.0 | 6.0 | 6.0 | 6.0 |
| | | DISPERSION LIQUID B *3 | — | — | — | — |
| | | DISPERSION LIQUID C | — | — | — | — |
| | SPECIFIC PERMEATING AGENT | 1,2-HEXANEDIOL | 3.0 | 2.0 | 2.0 | 2.0 |
| | | 1,2-BUTANEDIOL | — | — | — | — |
| | AMINOCOAT (BETAINE) | | — | — | — | — |
| | OTHER SOLVENTS | Gly | 8.0 | 8.0 | 8.0 | 8.0 |
| | | TEG | 5.0 | 5.0 | 5.0 | 5.0 |
| | | PROPYLENE GLYCOL | — | — | — | — |
| | | TEGmBE | 3.0 | 3.0 | 3.0 | 3.0 |
| | SURFACTANT | OLFINE 1010 | 2.0 | 2.0 | 2.0 | 2.0 |
| | | SURFYNOL 104 | 2.0 | 2.0 | 2.0 | 2.0 |
| | RESIN *1 | SUPERFLEX 420 | 0.5 | 0.5 | 0.5 | 0.5 |
| | ALKALI | TEA | 0.8 | 0.8 | 0.8 | 0.8 |
| | | PURE WATER | BALANCE | BALANCE | BALANCE | BALANCE |
| | | TOTAL | 100 | 100 | 100 | 100 |
| PIGMENT PARTICLE DIAMETER (D50) | | [nm] | 100 | 110 | 70 | 100 |
| INK COATING AMOUNT | | [mg/inch2] | 5 | 5 | 5 | 4 |
| EVALUATION RESULT | RED SATURATION | | A | A | B | B |
| | PRIMARY CURLING ANGLE | | A | A | A | A |

TABLE 1-continued

| | | | | | |
|---|---|---|---|---|---|
| SECONDARY CURLING HEIGHT | | A | A | A | A |
| PRECIPITATION | | A | B | A | B |
| COLOR DEVELOPMENT PROPERTY | | A | A | A | A |
| BLEEDING | | B | AA | AA | AA |

TABLE 2

| | | | EXAMPLE 9 | EXAMPLE 10 | EXAMPLE 11 | EXAMPLE 12 |
|---|---|---|---|---|---|---|
| INK JET INK COMPOSITION | PIGMENT*1 | DISPERSION LIQUID A *2 | 6.0 | 6.0 | 6.0 | 6.0 |
| | | DISPERSION LIQUID B ^3 | — | — | — | — |
| | | DISPERSION LIQUID C | — | — | — | — |
| | SPECIFIC PERMEATING AGENT | 1,2-HEXANEDIOL | 2.0 | 2.0 | 2.0 | — |
| | | 1,2-BUTANEDIOL | — | — | — | 2.0 |
| | AMINOCOAT (BETAINE) | | — | — | 5.0 | — |
| | OTHER SOLVENTS | Gly | 8.0 | 8.0 | 8.0 | 8.0 |
| | | TEG | 5.0 | 5.0 | 5.0 | 5.0 |
| | | PROPYLENE GLYCOL | — | — | — | — |
| | | TEGmBE | 3.0 | 3.0 | 3.0 | 3.0 |
| | SURFACTANT | OLFINE 1010 | 2.0 | 2.0 | 2.0 | 2.0 |
| | | SURFYNOL 104 | 2.0 | 2.0 | 2.0 | 2.0 |
| | RESIN *1 | SUPERFLEX 420 | 0.5 | 0.5 | 0.5 | 0.5 |
| | ALKALI | TEA | 0.8 | 0.8 | 0.8 | 0.8 |
| | PURE WATER | | BALANCE | BALANCE | BALANCE | BALANCE |
| | TOTAL | | 100 | 100 | 100 | 100 |
| PIGMENT PARTICLE DIAMETER (D50) | | [nm] | 100 | 100 | 100 | 100 |
| INK COATING AMOUNT | | [mg/inch2] | 3 | 6 | 5 | 5 |
| EVALUATION RESULT | RED SATURATION | | B | A | A | B |
| | PRIMARY CURLING ANGLE | | A | B | A | A |
| | SECONDARY CURLING HEIGHT | | AA | B | AA | A |
| | PRECIPITATION | | B | A | A | A |
| | COLOR DEVELOPMENT PROPERTY | | B | A | A | B |
| | BLEEDING | | AA | A | AA | AA |

| | | | EXAMPLE 13 | COMPARATIVE EXAMPLE 1 | COMPARATIVE EXAMPLE 2 | COMPARATIVE EXAMPLE 3 |
|---|---|---|---|---|---|---|
| INK JET INK COMPOSITION | PIGMENT*1 | DISPERSION LIQUID A *2 | — | — | 6.0 | — |
| | | DISPERSION LIQUID B ^3 | — | 6.0 | — | 6.0 |
| | | DISPERSION LIQUID C | 6.0 | — | — | — |
| | SPECIFIC PERMEATING AGENT | 1,2-HEXANEDIOL | 2.0 | — | — | — |
| | | 1,2-BUTANEDIOL | — | — | — | — |
| | AMINOCOAT (BETAINE) | | — | — | — | — |
| | OTHER SOLVENTS | Gly | 8.0 | 8.0 | 8.0 | 8.0 |
| | | TEG | 5.0 | 5.0 | 5.0 | 5.0 |
| | | PROPYLENE GLYCOL | — | — | — | — |
| | | TEGmBE | 3.0 | 3.0 | 3.0 | 3.0 |
| | SURFACTANT | OLFINE 1010 | 2.0 | 2.0 | 2.0 | 2.0 |
| | | SURFYNOL 104 | 2.0 | 2.0 | 2.0 | 2.0 |
| | RESIN *1 | SUPERFLEX 420 | 0.5 | 0.5 | 0.5 | 0.5 |
| | ALKALI | TEA | 0.8 | 0.8 | 0.8 | 0.8 |
| | PURE WATER | | BALANCE | BALANCE | BALANCE | BALANCE |
| | TOTAL | | 100 | 100 | 100 | 100 |
| PIGMENT PARTICLE DIAMETER (D50) | | [nm] | 100 | 100 | 100 | 100 |
| INK COATING AMOUNT | | [mg/inch2] | 5 | 5 | 5 | 3 |
| EVALUATION RESULT | RED SATURATION | | B | C | B | C |
| | PRIMARY CURLING ANGLE | | A | A | A | A |
| | SECONDARY CURLING HEIGHT | | A | A | A | A |
| | PRECIPITATION | | A | A | A | B |
| | COLOR DEVELOPMENT PROPERTY | | B | C | C | C |
| | BLEEDING | | AA | B | A | B |

TABLE 3

| | | | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|
| INK JET INK COMPOSITION | PIGMENT*1 | DISPERSION LIQUID A *2 | 6.0 | 6.0 | — | 6.0 |
| | | DISPERSION LIQUID B *3 | — | — | 6.0 | — |
| | | DISPERSION LIQUID C | — | — | — | — |
| | SPECIFIC PERMEATING AGENT | 1,2-HEXANEDIOL | — | — | 2.0 | — |
| | | 1,2-BUTANEDIOL | — | — | — | — |
| | AMINOCOAT (BETAINE) | | — | — | — | — |
| | OTHER SOLVENTS | Gly | 8.0 | 8.0 | 8.0 | 8.0 |
| | | TEG | 5.0 | 5.0 | 5.0 | 5.0 |
| | | PROPYLENE GLYCOL | — | 2.0 | — | — |
| | | TEGmBE | 3.0 | 3.0 | 3.0 | 3.0 |
| | SURFACTANT | OLFINE 1010 | 2.0 | 2.0 | 2.0 | 2.0 |
| | | SURFYNOL 104 | 2.0 | 2.0 | 2.0 | 2.0 |
| | RESIN *1 | SUPERFLEX 420 | 0.5 | 0.5 | 0.5 | 0.5 |
| | ALKALI | TEA | 0.8 | 0.8 | 0.8 | 0.8 |
| | PURE WATER | | BALANCE | BALANCE | BALANCE | BALANCE |
| | TOTAL | | 100 | 100 | 100 | 100 |
| PIGMENT PARTICLE DIAMETER (D50) | | [nm] | 100 | 100 | 100 | 100 |
| INK COATING AMOUNT | | [mg/inch2] | 3 | 5 | 3 | 7 |
| EVALUATION RESULT | RED SATURATION | | B | B | C | A |
| | PRIMARY CURLING ANGLE | | A | A | A | C |
| | SECONDARY CURLING HEIGHT | | A | A | A | C |
| | PRECIPITATION | | B | A | B | A |
| | COLOR DEVELOPMENT PROPERTY | | C | C | B | A |
| | BLEEDING | | B | A | B | B |

| | | | COMPARATIVE EXAMPLE 8 | COMPARATIVE EXAMPLE 9 | COMPARATIVE EXAMPLE 10 |
|---|---|---|---|---|---|
| INK JET INK COMPOSITION | PIGMENT*1 | DISPERSION LIQUID A *2 | 6.0 | 8.0 | 6.0 |
| | | DISPERSION LIQUID B *3 | — | — | — |
| | | DISPERSION LIQUID C | — | — | — |
| | SPECIFIC PERMEATING AGENT | 1,2-HEXANEDIOL | 2.0 | 2.0 | 4.0 |
| | | 1,2-BUTANEDIOL | — | — | — |
| | AMINOCOAT (BETAINE) | | — | — | — |
| | OTHER SOLVENTS | Gly | 8.0 | 8.0 | 8.0 |
| | | TEG | 5.0 | 6.0 | 5.0 |
| | | PROPYLENE GLYCOL | — | — | — |
| | | TEGmBE | 3.0 | 3.0 | 3.0 |
| | SURFACTANT | OLFINE 1010 | 2.0 | 2.0 | 2.0 |
| | | SURFYNOL 104 | 2.0 | 2.0 | 2.0 |
| | RESIN *1 | SUPERFLEX 420 | 0.5 | 0.5 | 0.5 |
| | ALKALI | TEA | 0.8 | 0.8 | 0.8 |
| | PURE WATER | | BALANCE | BALANCE | BALANCE |
| | TOTAL | | 100 | 100 | 100 |
| PIGMENT PARTICLE DIAMETER (D50) | | [nm] | 120 | 120 | 100 |
| INK COATING AMOUNT | | [mg/inch2] | 7 | 5 | 5 |
| EVALUATION RESULT | RED SATURATION | | A | A | A |
| | PRIMARY CURLING ANGLE | | C | A | A |
| | SECONDARY CURLING HEIGHT | | C | A | A |
| | PRECIPITATION | | B | C | A |
| | COLOR DEVELOPMENT PROPERTY | | A | A | A |
| | BLEEDING | | B | AA | C |

The abbreviations and product names shown in Tables 1 to 3 will be further described.

Dispersion Liquid A (*2)

After pure water was added to 20 percent by mass of a pigment (C.I. Pigment Red 150 (azo-based pigment) and 7 percent by mass of a sodium hydroxide neutralized product of a styrene-acrylic acid copolymer (acid value: 175 mgKOH/g, molecular weight: 10,000) so that the total amount was set to 100 percent by mass, stirring and mixing were performed, so that a mixture was obtained. This mixture was charged in a wet-type sand mill filled with zirconia beads having a diameter of 0.3 mm and was then processed by a dispersion treatment for 6 hours. Subsequently, the zirconia beads were removed using a separator, and filtration was performed by a cellulose acetate filter having a pore diameter of 3.0 pm, so that the pigment dispersion liquid A shown in the table was obtained. In addition, as the styrene-acrylic acid copolymer, Joncryl 678 (trade name, manufactured by BASF) was used. The volume average particle diameter D50 of the pigment in the dispersion liquid thus obtained was 100 nm. In addition, a dispersion liquid having a larger particle diameter of the pigment shown in the table and a dispersion liquid having a smaller particle diameter of the pigment shown in the table were separately prepared by increasing and decreasing a dispersion treatment time, respectively, and were then used.

Dispersion Liquid B (*3)

Except for that the pigment was changed to C.I. Pigment Violet 19 (quinacridone-based pigment), the dispersion liquid B was prepared in a manner similar to that of the dispersion liquid A.

Dispersion Liquid C

Except for that the pigment was changed to C.I. Pigment Violet 269 (azo-based pigment), the dispersion liquid C was prepared in a manner similar to that of the dispersion liquid A.

Aminocoat (betaine): trimethylglycine (manufactured by Asahi Kasei Finechem Co., Ltd.)
Gly: glycerin
TEG: triethylene glycol
TEGmBE: triethylene glycol monobutyl ether
Olfine E1010: acetylene glycol-based surfactant (manufactured by Nisshin Chemical Industry Co., Ltd.)
Surfynol 104: acetylene glycol-based surfactant (manufactured by Air Products and Chemicals Inc.)
Superflex 420: urethane-based resin emulsion (manufactured by DKS Co., Ltd.)
TEA: triethanolamine 3.2. Evaluation Method 3.2.1. Printing Test A printing test was performed under the following conditions.

Printing machine: PX-M886FL (manufactured by Seiko Epson Corporation) modified machine After an ink droplet mass was set to 12.5 ng/dot, and a basic resolution was set to 600×600 dpi, a dot density was adjusted so that an adhesion amount (coating amount) for a solid pattern was set to the value shown in the table. That is, the number of ink droplets per one pixel was adjusted. As a recording medium, Xerox P paper (regular paper) was used.

3.2.2. Evaluation of Saturation

After cartridges filled with individual inks were fitted to a printer (PX-M886FL, modified machine, manufactured by Seiko Epson Corporation), in an environment at a temperature of 25° C. and a relative humidity of 50%, a test pattern was formed on Xerox P paper (regular paper) by single-sided printing so that the ink adhesion amount was set to the value shown in the table. The test pattern thus obtained was measured by a calorimeter, the saturation c* was evaluated in accordance with the following criteria, and the result is shown in the table.

A: $c^* \geq 60$
B: $60 > c^* \geq 55$
C: $55 > c^*$

In addition, as the test pattern, a red test pattern was recorded using an ink set and then measured by a colorimeter. Besides the magenta ink of each Example, the ink set used a cyan ink, a yellow ink, and a black ink. The cyan ink, the yellow ink, and the black ink were inks in each of which the pigment of the ink of Example 1 was replaced by C.I. Pigment Blue 15:3, C.I. Pigment Yellow 155, or carbon black.

3.2.3. Evaluation of Primary Curling

After cartridges filled with the individual inks were fitted to a printer (PX-M886FL, modified machine, manufactured by Seiko Epson Corporation), in an environment at a temperature of 25° C. and a relative humidity of 50%, a monochromatic solid pattern of the magenta ink of each Example was formed on A4-size Xerox P paper (regular paper) by single-sided printing at a printing density in a printing region of 204 mm×291 mm so that the ink adhesion amount was set to the value shown in the table. After the printing, the paper was left in a face-down state, and an angle formed between a floor surface and a straight line drawn from a point at which the paper and the floor surface were in contact with each other to a paper edge was measured as an index of the primary curling. Subsequently, the angle thus measured was evaluated in accordance with the following criteria, and the result is shown in the table.

A: maximum curling angle of less than 90°
B: maximum curling angle of 90° to less than 110°
C.: maximum curling angle of 110° or more 3.2.4. Evaluation of Secondary Curling After cartridges filled with the individual inks were fitted to a printer (PX-M886FL, modified machine, manufactured by Seiko Epson Corporation), in an environment at a temperature of 25° C. and a relative humidity of 50%, a monochromatic solid pattern of the magenta ink of each Example was formed on A4-size Xerox P paper (regular paper) by single-sided printing at a printing density in a printing region of 204 mm×291 mm so that the ink adhesion amount was set to the value shown in the table. After the printing, the solid pattern was left in a face-up state for 2 weeks, and a floating amount of a paper edge from a floor surface was measured as an index of the secondary curling. Subsequently, the floating amount thus measured was evaluated in accordance with the following criteria, and the result is shown in the table.

AA: floating amount of less than 10 mm

A: floating amount of 10 to less than 15 mm

B: floating amount of 15 to less than 20 mm

C: floating amount of 20 mm or more 3.2.5. Evaluation of Pigment Precipitation

First, 200 g (ink volume of the ink cartridge) of the ink of each Example was filled in the ink cartridge of the printer described above, and the cartridge was fitted thereto.

Subsequently, after ten test patterns (3×3 cm) each having the adhesion amount shown in the table were printed in one day, the same printing as described above was continued until the ink in the cartridge was used up, and the number of days required to use up the ink was shown by A days. The A days may be calculated from the ink amount used for the printing of the test pattern in one day.

In addition, 55.0 g of a new ink was prepared and then centrifuged at 12,100 rpm. A time for the centrifugation was set to 16 minutes×A/100 minutes.

In this evaluation, since the time to use up the ink in the cartridge by the printer is long, an acceleration test was performed with a centrifugal time corresponding to the time described above, and the degree of ink precipitation was confirmed.

As for the individual ink compositions, the absorbance of the new ink which was not centrifuged and the absorbance of the ink which was centrifuged were measured.

The absorbance was measured using a dilution liquid obtained in a manner such that 5 ml of each ink was sampled and then diluted with water 1,000 times.

As for the centrifuged ink, 5 ml of a top portion of the ink composition was sampled, and the absorbance thereof was measured in a manner similar to that described above.

The measurement value of the ink not centrifuged was regarded as the initial absorbance. The measurement value of the ink centrifuged was regarded as an absorbance after being left.

In addition, as the absorbance, a peak absorbance value was read. In addition, the pigment precipitation of each ink composition was evaluated in accordance with the following criteria, and the result is shown in the table.

A: relative error between initial absorbance and absorbance after being left is less than 15%.

B: relative error between initial absorbance and absorbance after being left is 15% to less than 20%.

C: relative error between initial absorbance and absorbance after being left is 20% or more.

Incidentally, the absorbance is proportional to the pigment concentration. Hence, the change in absorbance indicates the change in pigment concentration and also indicates generation of color irregularity. Accordingly, the generation of color irregularity can be evaluated by measurement of the change in absorbance (pigment precipitation).

3.2.6. Evaluation of Color Development Property

A monochromatic magenta test pattern was recorded on Xerox P paper (regular paper) by a recording apparatus so that the ink adhesion amount was set to the value shown in the table. As a colorimeter, Xrite i1 (manufactured by Xrite) was used. The test pattern was measured by the colorimeter to obtain an OD value and then evaluated in accordance with the following criteria, and the result is shown in the table.

A: $OD \geq 0.85$

B: $0.85 > OD \geq 0.75$

C: $0.75 > OD$ 3.2.7. Evaluation of Bleeding

After cartridges filled with the individual inks were fitted to a printer (PX-M886FL, modified machine, manufactured by Seiko Epson Corporation), in an environment at a temperature of 25° C. and a relative humidity of 50%, a monochromatic test pattern of the magenta ink of each Example was printed on Xerox P paper (regular paper) so that the ink adhesion amount was set to the value shown in the table. After being dried for 30 minutes in an environment at ordinary temperature, the bleeding of a printed matter was evaluated by visual inspection and by a loupe. The evaluation criteria were as described below, and the result is shown in the table. In addition, AA, A, and B evaluations are regarded to be included in a practically usable region. In addition, in the test pattern, when the ink density was not uniform, the bleeding was observed.

AA: No bleeding is observed by visual inspection and by loupe.

A: Although bleeding is slightly observed by loupe, no bleeding is observed by visual inspection.

B: Bleeding is slightly observed by visual inspection.

C: Bleeding is apparently observed by visual inspection.

3.3. Evaluation Results

From Tables 1 to 3, it is found that in the ink jet ink composition of each Example which is the water-based magenta ink containing the azo-based pigment and the 1,2-alkanediol having 4 to 8 carbon atoms, the volume average particle diameter D50 of the azo-based pigment being 110 nm or less, and the content of the 1,2-alkanediol having 4 to 8 carbon atoms with respect to the total mass of the composition being 3.5 percent by mass or less, the saturation and the color development property of the image to be obtained are preferable, the bleeding thereof is suppressed, and the precipitation of the component and the curling of the recording medium are suppressed.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions can be obtained.

An ink jet ink composition which is a water-based magenta ink, comprises an azo-based pigment and a 1,2-alkanediol having 4 to 8 carbon atoms, the azo-based pigment has a volume average particle diameter D50 of 110 nm or less, and a content of the 1,2-alkanediol having 4 to 8 carbon atoms with respect to a total mass of the composition is 3.5 percent by mass or less.

According to this ink composition, the saturation and the color development property of an image to be obtained are preferable, the bleeding thereof is suppressed, and the precipitation of the component and the curling of a recording medium are suppressed. According to this ink composition, since the azo-based pigment is used, the color of the magenta ink can be obtained, and in addition, an image having a higher red saturation, a high red color reproducibility, and a higher red color development property can be recorded.

In addition, according to this ink composition, since the content of the 1,2-alkanediol having 4 to 8 carbon atoms with respect to the total mass of the composition is 3.5 percent by mass or less, the lateral spreadability of dots on the recording medium can be enhanced, the saturation and the color development property of the pigment can be preferably and sufficiently obtained, and an image excellent in saturation and white-spot suppression can be obtained.

Furthermore, since the pigment and the specific solvent described above are used, without increasing an adhesion amount of the ink, the saturation and the white-spot suppression are preferable, and hence this composition is also excellent in suppression of the curling of the recording medium. In addition, a consumption of the ink can be decreased, and as a result, a printing cost can be reduced.

Furthermore, since the average particle diameter of the pigment is 110 nm or less, even when the consumption of the ink is small, and the ink is stored for a long period of time in a cartridge or a tank, the precipitation of the ink component can be suppressed, and the change in density of an image to be obtained can be suppressed. In addition, since the azo-based pigment is used, the saturation and the color development property are excellent, and even when the average particle diameter of the pigment is decreased, an image having preferable saturation and color development property can be sufficiently obtained.

In the ink jet ink composition described above, the azo-based pigment may be selected from C.I. Pigment Red 150, C.I. Pigment Red 269, and C.I. Pigment Red 17.

According to this ink composition, an image having a more excellent color development property can be obtained.

In the ink jet ink composition described above, the azo-based pigment may have a chemical structure represented by the following formula (I).

[Chem. 2]

(I)

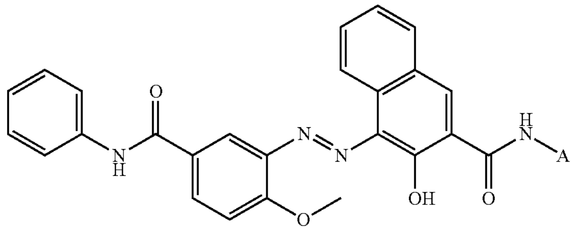

In the formula (I), A represents a hydrogen atom or an aromatic group.

According to this ink composition, an image having a further excellent color development property can be obtained.

In the ink jet ink composition described above, a content of the azo-based pigment with respect to the total mass of the composition may be 3 to 7 percent by mass.

According to this ink composition, an image having a further excellent color development property can be obtained.

In the ink jet ink composition described above, the content of the 1,2-alkanediol having 4 to 8 carbon atoms with respect to the total mass of the composition may be 1.5 to 3.5 percent by mass.

According to this ink composition, since the content of the specific 1,2-alkanediol is more appropriate, the ink spreadability is made more appropriate, and the bleeding and/or color mixing in the image is more unlikely to be generated.

In the ink jet ink composition described above, the azo-based pigment may have a volume average particle diameter D50 of 80 to 110 nm.

According to this ink composition, the dispersion stability of the pigment is preferable, the color development property thereof is more preferable, and the precipitation of the component during the storage can be further suppressed.

The ink jet ink composition described above may further comprise a betaine compound.

According to this ink composition, the effect to suppress the curling of the recording medium is more enhanced. The curling suppression effect is more significant, in particular, in the secondary curling (permanent curling). Although the primary curling (curling generated immediately after the ink adhesion) is also likely to be suppressed, when the stacking property is a problem such that sheets discharged and stacked on a tray are not neatly received therein due to the generation of the primary curling and are protruded from the tray, a decrease of the ink adhesion amount is more effective.

In the ink jet ink composition described above, a content of the betaine compound with respect to the total mass of the composition may be 4 to 6 percent by mass.

According to this ink composition, the effect to suppress the secondary curling of the recording medium can be further enhanced.

The ink jet ink composition described above may also be used for recording on an absorbing recording medium.

According to this ink composition, even when an absorbing recording medium, such as regular paper, which is liable to cause curling and ink permeation is used, the saturation and the color development property of an image to be obtained are preferable, the bleeding thereof is suppressed, and the effect to suppress the precipitation of the component and the curling of the recording medium can be more significantly obtained.

A recording method is a recording method to be performed using the ink jet ink composition described above, and the method comprises an ink adhesion step of ejecting the ink jet ink composition from an ink jet head so as to be adhered to a recording medium.

According to this recording method, the saturation and the color development property of an image to be obtained are preferable, the bleeding thereof is suppressed, and a recorded matter which suppresses the precipitation of the component and the curling of the recording medium can be obtained.

In the recording method described above, the recording medium may be an absorbing recording medium.

According to this recording method, the saturation and the color development property of an image to be obtained are preferable, the bleeding thereof is suppressed, and the effect to suppress the precipitation of the component and the curling of the recording medium can be more significantly obtained.

In the recording method described above, an adhesion amount of the ink jet ink composition to the recording medium in the ink adhesion step may be 6 mg/inch$^2$ or less.

According to this recording method, the effect to suppress the curling of the recording medium can be more significantly obtained.

What is claimed is:

1. A recording method comprising:

an ink adhesion step of ejecting an ink jet ink composition from an ink jet head so as to be adhered to a recording medium, wherein the recording medium is regular paper; and the ink jet ink composition is a water-based magenta ink, including:

an azo-based pigment; and a 1,2-alkanediol having 4 to 8 carbon atoms, wherein the azo-based pigment has a volume average particle diameter D50 of 110 nm or less, the azo-based pigment includes C.I. Pigment Red 150, a content of the C.I. Pigment Red 150 with respect to a total mass of the ink jet ink composition is 5 to 10% by mass, and a content of the 1,2-alkanediol having 4 to 8 carbon atoms with respect to a total mass of the composition is 1.5 to 2.5 percent by mass the ink jet ink composition includes Olfine E1010 and Surfynol 104, and a maximum adhesion amount of the ink jet ink composition to the recording medium in the ink adhesion step is 6 mg/inch$^2$ or less.

2. The recording method according to claim 1, wherein a content of the C.I. Pigment Red 150 with respect to a total mass of the ink jet ink composition is 5 to 8 percent by mass.

3. The recording method according to claim 1, wherein the azo-based pigment has a chemical structure represented by the following formula (I):

[Chem. 1]

(I)

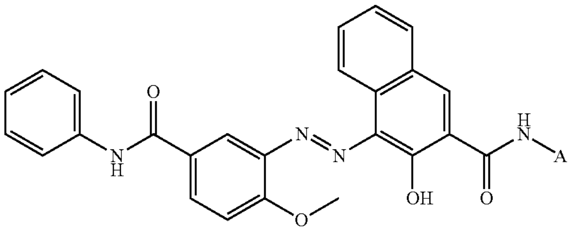

where in the formula (I), A represents a hydrogen atom or an aromatic group.

4. The recording method according to claim 1, wherein a content of the azo-based pigment with respect to the total mass of the composition is 3 to 7 percent by mass.

5. The recording method according to claim 1, wherein the content of the 1,2-alkanediol having 4 to 8 carbon atoms with respect to the total mass of the ink jet ink composition is 1.7 to 2.5 percent by mass.

6. The recording method according to claim 1, wherein the azo-based pigment has a volume average particle diameter D50 of 80 to 110 nm.

7. The recording method according to claim 1, wherein the ink jet ink composition includes a betaine compound.

8. The recording method according to claim 1, wherein a content of the betaine compound with respect to the total mass of the ink jet ink composition is 4 to 6 percent by mass.

9. The recording method according to claim 1, wherein the maximum adhesion amount of the ink jet ink composition to the recording medium in the ink adhesion step is 2 to 6 mg/inch$^2$.

* * * * *